United States Patent [19]
Atkinson et al.

[11] Patent Number: 5,354,530
[45] Date of Patent: Oct. 11, 1994

[54] PRESSURE FLUID STABILIZED REGULATOR WITH LEAKAGE ORIFICE AND METHOD OF FORMING PRECISE MOLDED ORIFICE UNITS

[75] Inventors: Louis D. Atkinson, New Berlin; Ronald L. Daggett, Madison; Dean C. Vandeberg, Middleton, all of Wis.

[73] Assignee: Airtrol Components, Inc., New Berlin, Wis.

[21] Appl. No.: 7,087

[22] Filed: Jan. 21, 1993

[51] Int. Cl.$^5$ .................. B29C 33/38; B29C 33/44
[52] U.S. Cl. .................. 264/219; 138/43; 249/176; 264/318; 264/328.9; 425/577; 425/DIG. 58
[58] Field of Search .................. 249/142, 175, 176; 264/219, 318, 328.9, 154, 155; 425/577, DIG. 58; 138/43

[56] References Cited

U.S. PATENT DOCUMENTS

| | | | |
|---|---|---|---|
| 2,845,668 | 8/1958 | Péras | 249/142 |
| 3,646,185 | 2/1972 | Jennings | 264/318 |
| 3,970,734 | 7/1976 | Broux | 264/219 |
| 4,025,269 | 5/1977 | Reinders | 425/577 |
| 4,209,160 | 6/1980 | Vanotti | 264/318 |
| 4,298,566 | 11/1981 | Naus et al. | 264/318 |
| 4,315,520 | 2/1982 | Atkinson et al. | 137/82 |
| 4,647,419 | 3/1987 | Helfer et al. | 425/577 |
| 4,969,811 | 11/1990 | Littleton | 425/577 |
| 5,007,822 | 4/1991 | Hara et al. | 425/588 |
| 5,038,455 | 8/1991 | Gurst | 425/577 |

*Primary Examiner*—Jay H. Woo
*Assistant Examiner*—Robert B. Davis
*Attorney, Agent, or Firm*—Andrus, Sceales, Starke & Sawal

[57] ABSTRACT

A fluid pressure regulator includes a diaphragm operated leakport controlling low liquid or fluid flow rates. A precisely formed leakage unit spaced from the leakport establishes continuous flow from the input to the output. The leakage unit includes a separate orifice unit having an integral molded body and internal precision orifice establishing the continuous flow. A multiple mold core unit for molding an integral body and orifice including a pair of aligned mold cores have opposed planar surfaces located at the orifice plane. A small gap is held between the opposed end surfaces. The orifice unit is molded as a single plastic element without flash at the orifice. The orifice has a diameter in the range of about 0.001 to 0.030 inches, and may be used in various applications requiring precise low flows. The orifice unit may include an elongated tubular body with an internal orifice molded as single integral members. The tubular body establishes opposite connection permitting connection using standard tubing and the like. Within flow limits, the orifice unit is operable with a bi-directional flow to control precise flows such as intervenous liquids at 100 cc per minute, LP gas burners and other low flows.

5 Claims, 2 Drawing Sheets

FIG. 4a
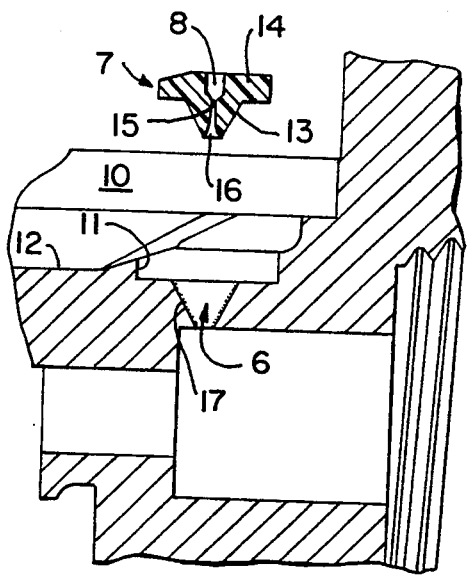
FIG. 5
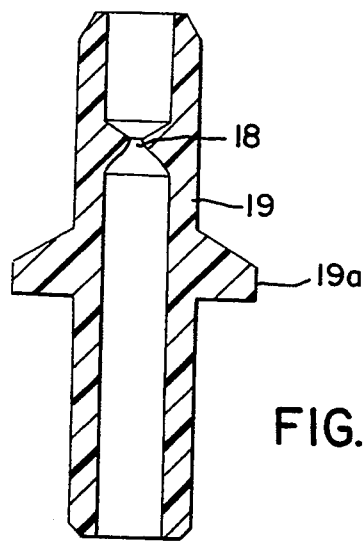
FIG. 7
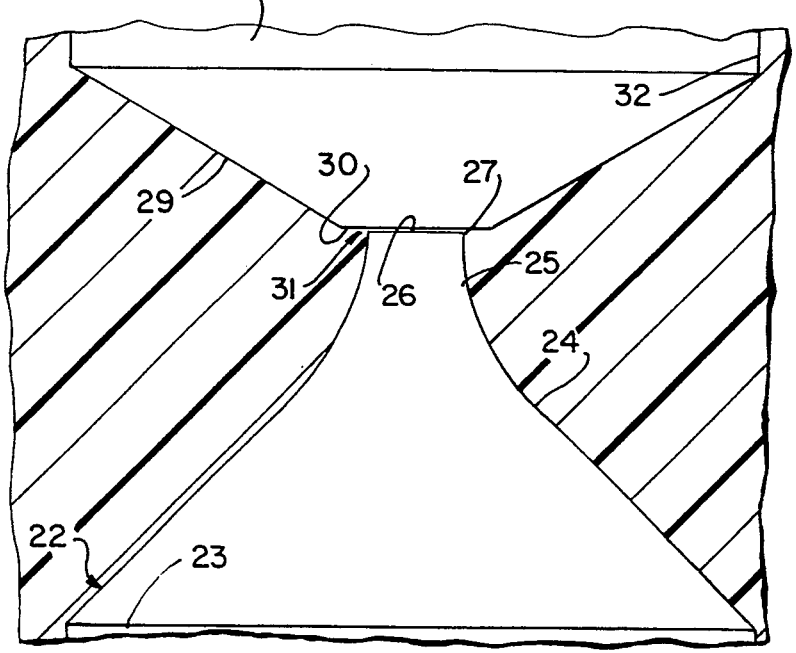
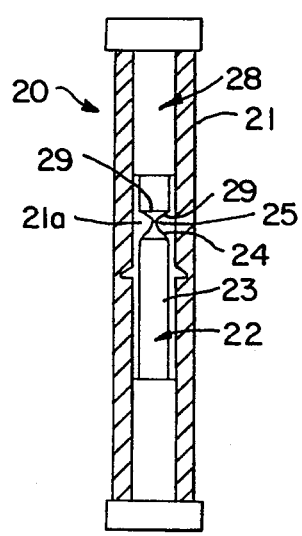
FIG. 6

PRESSURE FLUID STABILIZED REGULATOR WITH LEAKAGE ORIFICE AND METHOD OF FORMING PRECISE MOLDED ORIFICE UNITS

BACKGROUND OF THE INVENTION

This invention relates a stabilized fluid pressure regulator and particular to a fluid regulator including a leakport orifice having a pressure responsive closure unit and having a leakage orifice unit, and to the method of forming precise orifice units.

As fully set forth in the U.S. Pat. No. 4,315,520 whereby issued Feb. 16, 1982 to the present inventor, leakport orifice regulators having a pressure responsive closure elements are well known and used in providing a regulated fluid pressure or flow in response to an input signal. Closure elements generally may include a diaphragm, a bimetal sensor and the like. The system encounters a relatively unstable condition as the gap in the leakport orifice moves to a close spaced relation, establishes a minimal gap for the air flow, resulting in vibration of the closure member. The subject patent discloses a particularly satisfactory solution which minimizes the above adverse characteristics. As fully disclosed therein, forming of the orifice unit with minute notches in a sharp ended planar orifice creates a continuous leakage path and a minimal flow is maintained under all conditions. Further, as the flow gap is reduced, the leakage flow forms a progressively increasing proportion of the total flow. The system results in essentially eliminating the vibration characteristic previously encountered and a stable output pressure, which is free of audible noise or the like.

Although the specially formed orifice has found substantial commercial acceptance, a demand continues for an even more stable structure. Thus, as the orifice is closed, the diaphragm is squeezed onto the orifice and there is a change in the leakage flow. This results in some change in the characteristics.

Orifices, which have been heretofore made through molding are generally limited to orifice openings on the order or 0.030 inches of greater, the molding apparatus includes a pin member corresponding to the diameter of the hole and an opposed core member which is provided with an aperture substantially the same as the diameter of the pin. The pin is telescoped into the hole and the orifice unit is molded about such assembled cores. However, in the telescoped construction, mere flashing tends to occur. The flash creates a flexible closure which responds in the flow to move into the orifice under operating conditions. Such structure dramatically changes the characteristic of the orifice and significantly reduces the quality of the flow control device. Small orifices have generally involved jeweled orifices. In forming of jewel orifices, the orifice itself is constructed using the laser or other effective cutting methods for forming the orifice opening. The orifice is formed however as a separate element and then mounted in a body or housing for coupling and connection into a system such as a connecting tube unit, a housing or the like. Thus, it is not formed as a self contained element which can be connected directly into a fluid device or to connecting tubes for connections in a fluid circuit.

SUMMARY OF THE INVENTION

The present invention is particularly directed to pressure regulator having a controlled leakage path to meet the additional commercial demand. Generally in accordance with the present invention, a precisely formed leakage port is constructed within the leakport unit wall in spaced relation to the leakport passage. The leakage or by-path port is a precision formed or orifice opening which establishes a continuous flow about the leakport orifice which is constant for all positions of the main leakport unit of the pressure regulator.

In a preferred and optimum embodiment, the leakport orifice is constructed within a lateral wall in substantially coplanar relationship to the orifice, and with the wall forming a common wall between the inlet side and the outlet side of the orifice chambers. A small opening is formed in the wall. A separate orifice element which is separately molded with a precise leakage orifice opening formed within an integral body is inserted into the small opening and secured therein as an integrated leak proof construction to establish and maintain a continuous leakage flow across the leakport orifice.

In a particularly practical construction, the leakage opening includes a simple molded opening in a molded leakport body having the lateral wall extended from the orifice. The leakage opening includes a recess in the exposed surface of the wall with a conical opening projection therefrom into communication with the port to the opposite side of the leakport orifice. The precision formed leakage orifice member is an element having a tubular body with a flange which fits within the recess. The tubular body has a precisely formed axial opening which is substantially free of any surface flaws which might create turbulence in the leakage flow and further has an orifice integrally molded with the tubular body as a one piece element.

The separate spaced leakage orifice unit establishes a regulator having all the advantages of the notched leakport orifice and an improved overall response as the flow is constant for all valve positions.

In accordance with another aspect of the invention, the leakage orifice member is a plastic molded member which is molded from a unique multiple mold core element. Generally, in accordance with this teaching, the core members for forming of the central opening and the integral orifice include a pair of aligned mold cores having opposed planar surface located at the orifice plane in the molded orifice member. The planar flat surfaces of the cores are precise finished parts and are located in close spaced relation to produce a minute gap therebetween. In producing an orifice having a diameter on the order of 0.001 inches, a gap on the order of 0.001 between the opposed end surfaces of the cores has been used. The orifice unit is molded as a single plastic element having the integral internal orifice formed without flash or flow disturbing flaws within the leakage orifice, thereby assuring stable flow in the leakage orifice. The inventor has found this molded port produces small orifices with a flow characteristics which have previously only specified for jeweled orifice; that is, orifice produced using ruby or sphere elements in which the orifice is formed using a laser or the like. The molded orifices of this invention can be manufactured at a fraction of the cost of the prior art jeweled orifices.

Although the mold process could use close abutment between the pin and chamber cores, controlling the pressure engagement would be difficult as a practical production matter, thus one would anticipate wear with the repetitive engagement resulting in a lower quality product than with the construction using the relatively small gap. Thus, the position of the gap must be maintained minute but the precise length of the gap is not critical within normal manufacturing tolerances of precision devices. The present inventor has been found to provide a highly effective, cost effective small orifice unit.

The present invention relating to the molding process is particularly concerned with the mounting of a orifice within a housing for coupling or connection to a valve structure or as a separate orifice unit to which various tubing or lines are connected. Thus, the present invention is particularly applied to orifices having a diameter in the range of about 0.001 to 0.030 inches. Although the system or process can be applied with even smaller orifices, the efficiency of forming is significantly less. It can, of course, also be used to make higher diameter orifices but other alternative methods of forming such larger orifices are readily available. The present molded orifice unit with the integral body and internal orifice is therefore particularly directed to the smaller range inclusive of orifices substantially within the above described range.

The molded precision orifice may be used in various applications requiring a precision orifice, and particularly where the orifice can be conveniently bonded in place. Thus, in a particularly practical structure the orifice is formed within an elongated tubular body. The tubular body establishes opposite connection for connecting the orifice directly into a flow circuit.

A further advantage that the inventor has found with the molded orifice unit in accordance with the invention is that a unit designed for a particular flow, can operate in a bi-directional manner if the flow is restricted to changes of no more than about five percent of such rated flow. The forward direction is of course preferred but the unit does operate satisfactorily in the reverse direction. The basic flow rate of course is determined by the size of the orifice.

The present invention has been used controlling low flow which require precise flow, such as medical intervenous liquids at 100 cc per minute, LP gas burners and the like particularly where a low but precise flow is required.

The present invention provides an improved leakport orifice regulator, and a method of forming the necessary leakage or by-pass orifice which must be a precision passageway, free of all flash and the like within the orifice.

BRIEF DESCRIPTION OF THE DRAWINGS

The drawings furnished herewith illustrate the best mode presently contemplated for carrying out the invention and are described hereinafter.

In the drawings:

FIG. 4A is a fragmentary exploded view of the structure shown in FIG. 2.

FIG. 5 is a sectional view of another embodiment of a molded orifice unit.

FIG. 6 is a side elevational view of a mold core unit for fabrication of a precise flow orifice; and;

FIG. 7 is an enlarged sectional view of the mold core unit and more clearly illustrating the structural arrangement.

DESCRIPTION OF THE ILLUSTRATED EMBODIMENT

Figure 1:
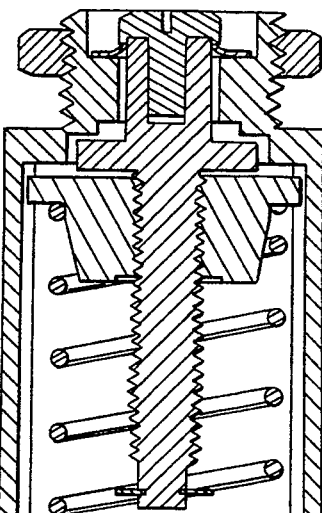
FIG. 1 is a sectional view of regulator incorporating an embodiment of the present invention.
Figure 3:
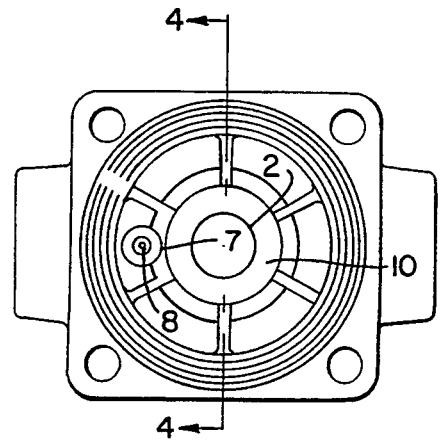
FIG. 3 is a plan enlarged view of the valve body.

Referring to the drawings and particularly to FIG. 1, a pressure regulator is shown including a valve body 1 with a diaphragm actuated valve closure unit 1a positioned in a leakport unit 2. The valve unit is adapted to form part of pressure regulator, such as disclosed in the Atkinson patent previously described. The valve body 1 has the central leakport unit 2 which in use is assembled with valve closure unit 1a. A by-pass or leakage port unit 3 is formed within the valve body 1 in spaced relation to the leakport unit 2 and establishes an unrestricted and continuous passage between the supply port 4 and the port 5 in the valve body 1. The leakage port unit 3 establishes a continuous auxiliary controlled air flow which essentially eliminates hysteresis and an improved regulation characteristic by causing a very slight overpressure in the output side of the regulator. In known construction, the excess pressure is then vented atmosphere by a secondary valve unit. A secondary valve unit can seal off the vent, whereby the auxiliary air flow in the leakage unit 3 is directed fully to rebalancing the leakport closure. For small unbalance conditions wherein the leakage flow required to correct the unbalance condition, is less than the leakage orifice's capacity, the primary leakport closure assembly need not change, thereby reducing the hysteresis of the entire system. In addition, the system minimizes the bleed of supply to atmosphere while maintaining hysteresis free functioning. The system also eliminates the bleed to atmosphere when forward flow is required from the regulator.

Thus, the structure shown is generally known in the art, except for the leakage port unit 3.

Figure 4:
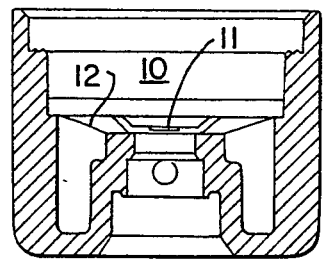
FIG. 4 is a sectional view taken on line 4—4 of FIG. 3.
Figure 2:
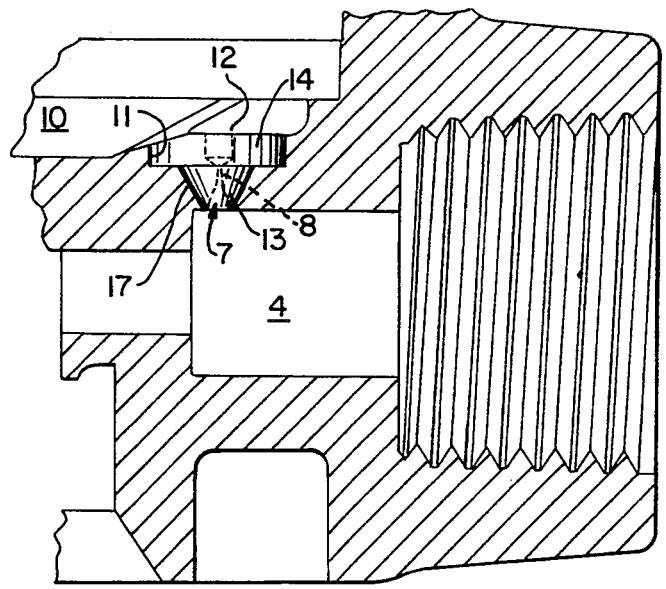
FIG. 2 is a separate sectional view of the valve body including the orifice unit.

In accordance with the illustrated embodiment of this invention, the leakage valve body 1 is formed with leakage opening spaced to one side of the leakport orifice. As shown most clearly in FIGS. 2 and 4a, the leakage unit 3 includes a precision molded plastic orifice unit 7 bonded within the opening 6 and defining a precision orifice passageway including a precise orifice 8 between the supply port 4 and the output side and chamber 10 of the leakport unit 2.

The opening 6 has a cone-shaped opening which extends outwardly from the supply or inlet port 4. The outer end of opening 6 includes a recess 11 in the upper wall 12 which extends laterally from the port 2. The upper wall 12 is shown raised slightly above the port for structural support in the area of the unit 3.

The molded plastic orifice unit 7 includes a tubular body 13 which is a cone corresponding to and located in the opening 6, with an integral top flange 14 located within the recess 11 in the wall 12. A precise round orifice 15 having an inlet end 16 is thus provided within the opening 6 in the body 13.

A suitable adhesive 17 secures the flanged orifice unit in the recess 11 with a fluid sealed connection. The leakage passageway is thereby restricted to the precision formed orifice. The orifices are generally formed with orifice diameters in the range of 0.0015 to 0.025 inches and may be applied to orifices in a range of 0.001 to 0.30 inches.

A further embodiment of the invention is shown in FIG. 5. In this embodiment, an orifice unit is molded with an orifice 18 is integrally formed within a tubular body 19, which adapts the unit for connection in circuit using conventional tubing or other suitable fluid connectors. The outer wall is shown with an integral flange 19a for mounting of the orifice unit to a support. Again, the unit provides an integral orifice and support body for direct use of the orifice unit in a device or circuit with integral connecting ends.

A particularly satisfactory and unique mold assembly for precision molding of the orifices is shown in FIGS. 6 and 7. A similar unit with an appropriate cavity can of course be used for the first embodiment of the orifice unit as well as any other design for a combined orifice and outer housing or body member. The mold assembly includes a core unit 20 and an outer split body unit 21 defining a cavity 21a for forming of the orifice unit of FIG. 5. The mold core unit 20 is shown as a two part member to form a sharply defined opening and orifice within the tubular body 13. The core member 22 in (FIGS. 6 and 7) has a cylindrical body 23 of a substantial diameter equal to the passageway in the orifice unit and a generally cone-shaped end portion. The cone-shaped ends included a tapered wall 24 to a precise round end portion 25, which defines a precise size orifice 18 to be formed within the tubular body 19. The wall of the core portion 24 joins to the straight orifice body 25, as a smooth curved junction. In a typical application, the wall 25 may be on the order of 0.010 inches, but can vary therefore. The end wall and face 26 of the round end portion 25 is a flat finished surface to form a sharp edge 27 at the orifice forming round end 25, completely free of flash.

The second core 28 is located in alignment with core 27 and has a similar body and a truncated end portion 29 including a flat finished end wall 30 in opposed alignment with the finished end wall and face 26 of the upper core 21.

The flat wall 30 of the lower core 28 is slightly larger than the opposed end wall 26 of the core member 22 with an outer tapered wall extending to the outer diameter of the cylindrical core portion 32.

The inventors have found that the relative location of the approved finished end faces 26 and 30 is critical to the forming of the orifice without any flash element at the end of the orifice 15. More particularly, the end faces 26 and 30 are preferably mounted within the mold assembly without significant abutting engagement, and preferably are mounted in slight spaced relation as at 31 to each other. In forming an orifice with a diameter of 0.001 inches, the cores were mounted with a spacing of substantially 0.001 inches. The resulting orifice unit had the desired precise formed orifice 18 without any evidence of flash. Further, the mold is used in mass production of orifice units without deterioration in the character or quality of the units.

The cone-shaped core end provides a smooth gradual taper to the orifice 18. The truncated end forms an enlarged outlet chamber adjacent the outlet side of the leakage orifice 18 with the sharp edge 27 and a precise step change.

The outer core wall and body unit 21 is shaped to form the flange 19a, integral with the tubular body 19. The flange 19a promotes creation of the fluid tight connection of the orifice unit within the valve body 19. The flange of course need not be provided.

The molding procedure is a standard used by any skilled molding shop. The orifice unit 7 is molded of a high quality polymeric plastic used for forming precision molded plastic ports. The plastic selected is a high strength, rigid plastic which maintains its shape and strength over the expected life of regulator and other devices and uses requiring small precision orifices and passageways. A stable engineering plastic is thus preferred. The inventors have used a polycarbonate and polysulfone. Both have good molding characteristics and particularly exhibit a minimum flash characteristic. Polysulfone is a higher temperature plastic but is somewhat more costly. Any suitable adhesive may be used, but the known bromocloramethane provides a particularly good, fluid tight seal of the above materials.

Although the molded orifice unit is shown in the special stabilized leakport application, the method of forming molded orifice is applicable and useful in forming of similar units for any other application which requires or in which a precision orifice is disusable.

Various modes of carrying out the invention are contemplated as being within the scope of the following claims particularly pointing out and distinctly claiming the subject matter which is regarded as the invention.

I claim:

1. The method of forming a flow orifice unit of a rigid and high strength plastic, comprising forming a mold having a two piece core of an inlet member and an outlet member, said inlet member being a cylindrical member having an orifice end, said orifice end having a finished flat end surface and a precise constant diameter round portion extending from said end surface toward an outer portion, said round portion being joined to said outer portion by smooth curved wall portion, said outlet member having a finished flat end of a diameter larger than flat end surface of said inlet member, and mounting said core members in alignment with said finished end surfaces in opposed relation with said end surfaces in precise parallel relationship and spaced from each other at a distance to establish a flash free step change at the end face of said molded orifice and defining a mold cavity adapted to be filled with a plastic for molding a flow orifice unit as a single piece plastic element, said plastic forming a rigid and high strength flow orifice unit.

2. The method of claim 1, wherein said round portion has a diameter in the range of 0.0005 to 0.025 inches.

3. The method of claim 1, including the method of forming an outer mold wall having a surface defining an outer wall of a tubular member, mounting said core within said outer mold wall, and filling said mold with plastic to form said flow orifice unit, said plastic being a high strength and rigid thermoset plastic.

4. The method of claim 3, wherein said plastic is selected from the group consisting of polycarbonate and polysulfone.

5. A mold unit for forming a single piece tubular member with an orifice therein, comprising an outer mold wall having a surface defining the outer wall of said tubular member, a core located within said outer mold wall including central orifice members including an inlet end member and an outlet end member located in adjacent opposed relationship, said inlet end member having an end face including a finished round surface projecting from said end face, said round surface having a diameter forming said orifice, said end face being a finished flat surface extending normal to said round surface, said outlet end member having an end face located in opposed relation to said end face of said end face of said inlet end member and extending outwardly of said inlet end member, said opposed end faces being in parallel relationship and spaced from each other at a distance to establish a flash free step change at the end face of said molded orifice.

* * * * *